United States Patent
Miller et al.

(10) Patent No.: US 10,850,665 B1
(45) Date of Patent: Dec. 1, 2020

(54) PROXIMITY WARNING SYSTEM FOR PARKED VEHICLES

(71) Applicant: Vantage Mobility International, LLC, Phoenix, AZ (US)

(72) Inventors: Mark Charles Miller, Gilbert, AZ (US); Jeffrey Powell Butler, Austin, TX (US); Kelly Eugene Stephenson, Chandler, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 16/898,698

(22) Filed: Jun. 11, 2020

Related U.S. Application Data

(60) Provisional application No. 62/887,372, filed on Aug. 15, 2019.

(51) Int. Cl.
| | |
|---|---|
| *G08B 21/00* | (2006.01) |
| *B60Q 9/00* | (2006.01) |
| *B60Q 5/00* | (2006.01) |
| *G01S 15/931* | (2020.01) |
| *H04L 12/40* | (2006.01) |
| *A61G 3/06* | (2006.01) |

(52) U.S. Cl.
CPC .............. *B60Q 9/008* (2013.01); *A61G 3/061* (2013.01); *B60Q 5/006* (2013.01); *G01S 15/931* (2013.01); *H04L 12/40032* (2013.01); *G01S 2015/932* (2013.01); *H04L 2012/40215* (2013.01); *H04L 2012/40273* (2013.01)

(58) Field of Classification Search
USPC .......................................................... 340/435
See application file for complete search history.

(56) References Cited

U.S. PATENT DOCUMENTS

| | | | |
|---|---|---|---|
| 6,043,741 A * | 3/2000 | Whitmarsh | A61G 3/06 340/522 |
| 2005/0077111 A1* | 4/2005 | Sobota | B66B 9/08 187/202 |
| 2006/0187009 A1* | 8/2006 | Kropinski | G01S 15/931 340/435 |
| 2016/0236523 A1* | 8/2016 | Moreau | B60C 23/0415 |
| 2016/0280131 A1* | 9/2016 | Carson, Jr. | G07C 5/0866 |
| 2017/0234053 A1* | 8/2017 | Myers | E05F 15/77 340/426.15 |

* cited by examiner

*Primary Examiner* — Brent Swarthout
(74) *Attorney, Agent, or Firm* — Fennemore Craig, P.C.

(57) ABSTRACT

A proximity alert system includes a control system. A sensor system operatively associated with the control system detects a presence of an object within a defined sensing region adjacent the vehicle. An annunciator system operatively associated with the control system provides an indication that the object has been detected within the defined sensing region. The control system actuates the sensor system when the vehicle is stationary and operates the annunciator system when the sensor system detects the presence of the object within the defined sensing region.

26 Claims, 5 Drawing Sheets

FIG.1

PROXIMITY WARNING SYSTEM FOR PARKED VEHICLES

CROSS-REFERENCE TO RELATED APPLICATION

This application claims the benefit of U.S. Provisional Patent Application No. 62/887,372, filed on Aug. 15, 2019, which is hereby incorporated herein by reference for all that it discloses.

TECHNICAL FIELD

The present invention relates to wheelchair accessible vehicles in general and more particularly to methods and systems for alerting others when they have positioned objects and things adjacent the vehicle so as to inhibit access.

BACKGROUND

Mobility-assist or wheelchair accessible vehicles are well-known in the art and are commonly provided with deployable ramps to allow persons requiring wheelchairs or other types of mobility assist systems to readily enter the vehicles, either to drive the vehicles or to ride along. Many such vehicles have side-deploying ramps, meaning that the ramps extend and retract from the sides of the vehicles. In other vehicles, the ramps may be deployed from the rear.

Regardless of the particular type of ramp system used, e.g., either side- or rear-deploying, it sometimes happens that another vehicle will park too close to a wheelchair accessible vehicle, i.e., either alongside or behind, thereby preventing the ramp from fully extending. Even if the ramp can be fully extended, there may not be enough room for a person in a wheelchair or other mobility assist system to maneuver into position and ascend the ramp.

SUMMARY OF THE INVENTION

One embodiment of a proximity alert system according to the teachings provided herein may include a control system. A sensor system operatively associated with the control system detects a presence of an object within a defined sensing region adjacent the vehicle. An annunciator system operatively associated with the control system provides an indication that the object has been detected within the defined sensing region. The control system actuates the sensor system when the vehicle is stationary and operates the annunciator system when the sensor system detects the presence of the object within the defined sensing region.

Also disclosed is a mobility assist vehicle that includes a ramp that is moveable between a deployed position and a stowed position. The ramp defines an access region adjacent the vehicle when the vehicle is stationary. A proximity alert system operatively associated with the mobility assist vehicle includes a control system. A sensor system operatively associated with the control system detects a presence of an object within the defined access region. An annunciator system operatively associated with the control system provides an indication that the object has been detected within the defined access region. The control system actuates the sensor system when the vehicle is stationary and operates the annunciator system when the sensor system detects the presence of the object within the access region.

A method of detecting a presence of an object within a defined sensing region adjacent a vehicle may include the steps of: Detecting an 'enable' command issued by a user; activating a sensor system in response to the sensed enable command; determining whether the sensor system has detected the presence of the object within the defined sensing region; and operating an annunciator system when the sensor system has detected the presence of the object within the defined sensing region, the annunciator system providing an indication that the object is present within the defined sensing region.

Also disclosed is a non-transitory computer-readable storage medium having computer-executable instructions embodied thereon that, when executed by at least one computer processor, cause the processor to: Detect an 'enable' command issued by a user; activate a sensor system operatively associated with a vehicle in response to the sensed enable command when the vehicle is stationary; determine whether the sensor system has detected the presence of an object within a defined sensing region adjacent the stationary vehicle; and operate an annunciator system when the sensor system has detected the presence of the object within the defined sensing region, the annunciator system providing an indication that the object is present within the defined sensing region.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
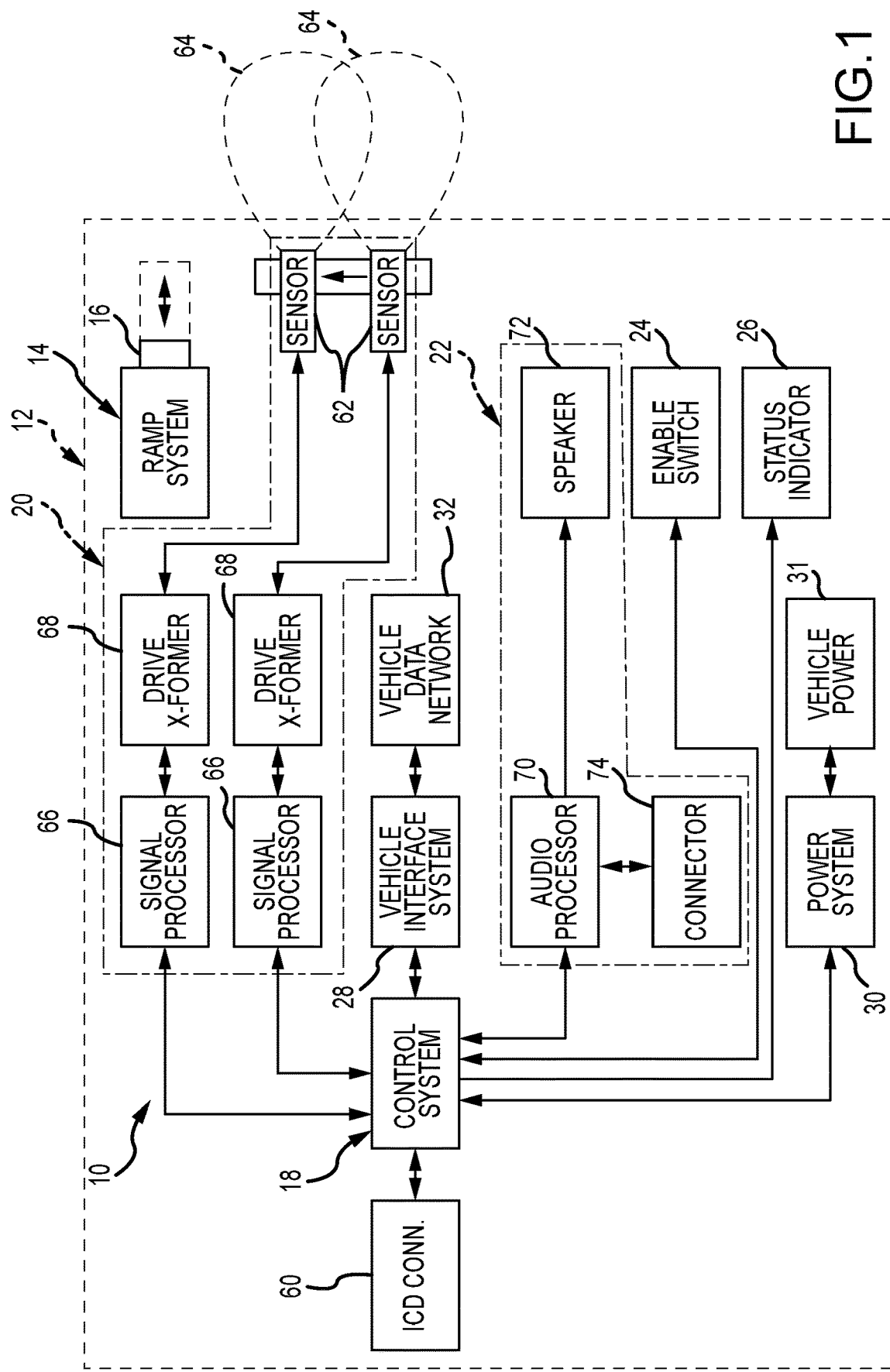
FIG. 1 is a schematic block diagram of one embodiment of the proximity alert system as it could be used in conjunction with a mobility assist vehicle having a side deploying ramp system.
Figure 2:
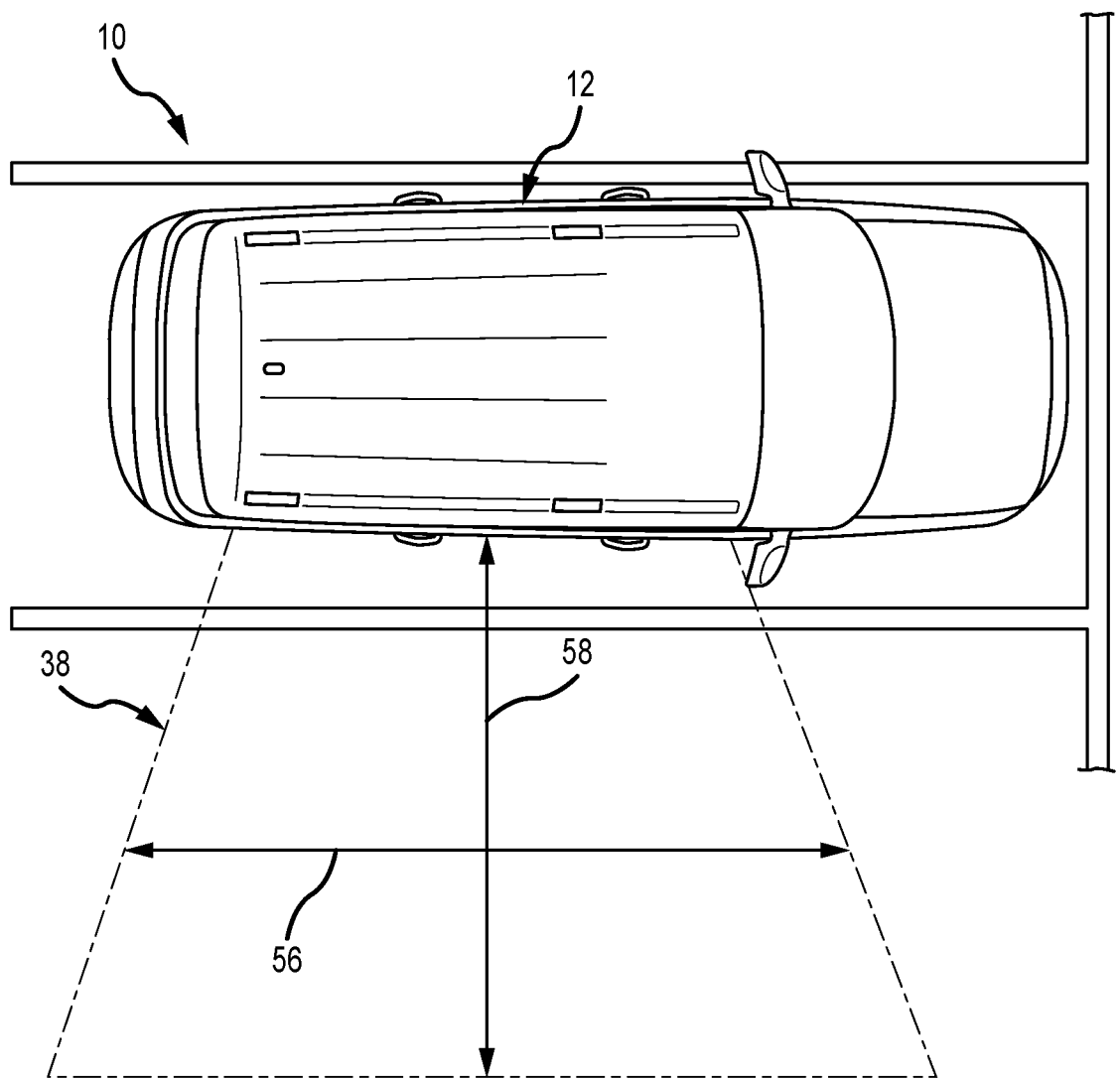
FIG. 2 is a top view of a mobility assist vehicle showing the approximate location of the defined sensing or ramp access region.
Figure 3:
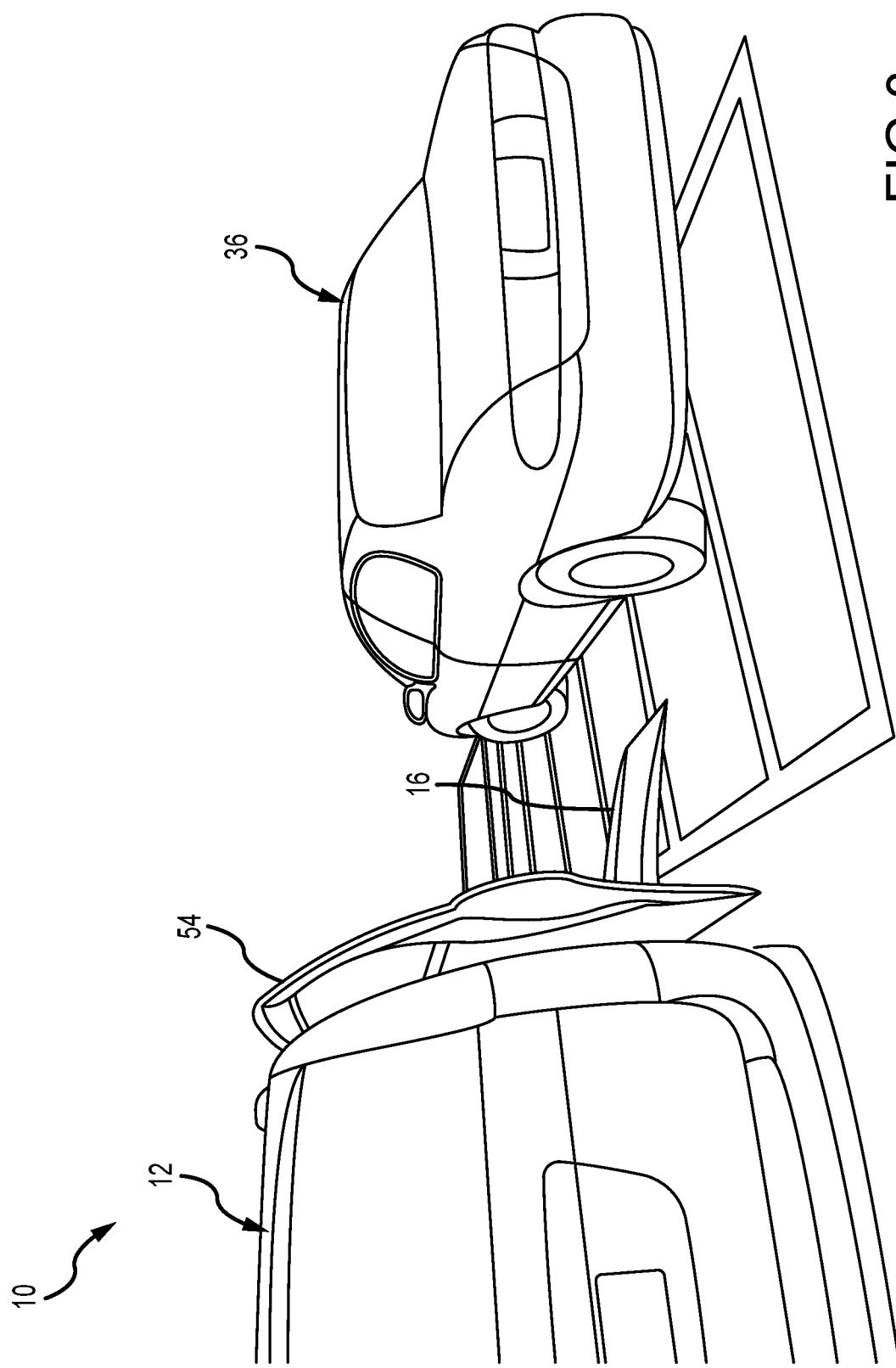
FIG. 3 is a perspective view of the mobility assist vehicle illustrated in FIG. 2 showing the ramp in the deployed position and the presence of another vehicle within the defined ramp access region.

One embodiment of a proximity alert system 10 according to the teachings provided herein is best seen in FIGS. 1-3 as it may be used in conjunction with a mobility assist or wheelchair accessible vehicle 12 having a ramp system 14 that includes a deployable ramp 16. The ramp 16 allows a disabled person in a wheelchair or other mobility assist system (not shown) to more easily enter and exit the vehicle 12.

Briefly, the proximity alert system 10 may include a control system 18, a sensor system 20, and an annunciator system 22. Sensor system 20 and annunciator system 22 are operatively connected to control system 18. Control system 18 may be configured or programmed to control the functions and operations of the sensor and annunciator systems 20 and 22 in accordance with the teachings provided herein. The proximity alert system 10 may also comprise an enable switch 24 operatively connected to the control system 18. Enable switch 24 may be used by an operator or user (not shown) to place the proximity alert system 10 in either of an enabled state or a disabled state, as will be described in further detail herein. The proximity alert system 10 may also include a system status indicator 26 operatively associated with control system 18. System status indicator 26 may be used to provide a status indication of whether the proximity alert system 10 is in the enabled state or the disabled state.

The proximity alert system 10 may also be provided with a variety of ancillary systems and devices, such as a vehicle interface system 28 and a power system 30, that may be required or desired for the operation of the proximity alert system 10 with any desired vehicle 12. For example and in the particular embodiments shown and described herein, the vehicle interface system 28 is operatively associated with the control system 18 and allows the proximity alert system 10 to communicate and/or interface with a vehicle data network 32 operatively associated with vehicle 12. Power system 30 provides electrical power suitable for the operation of the various systems and devices comprising proximity alert system 10. Power system 30 may derive the electrical power required to operate the proximity alert system 10 from the electrical system 31 of vehicle 12, although other arrangements are possible.

Figure 5:
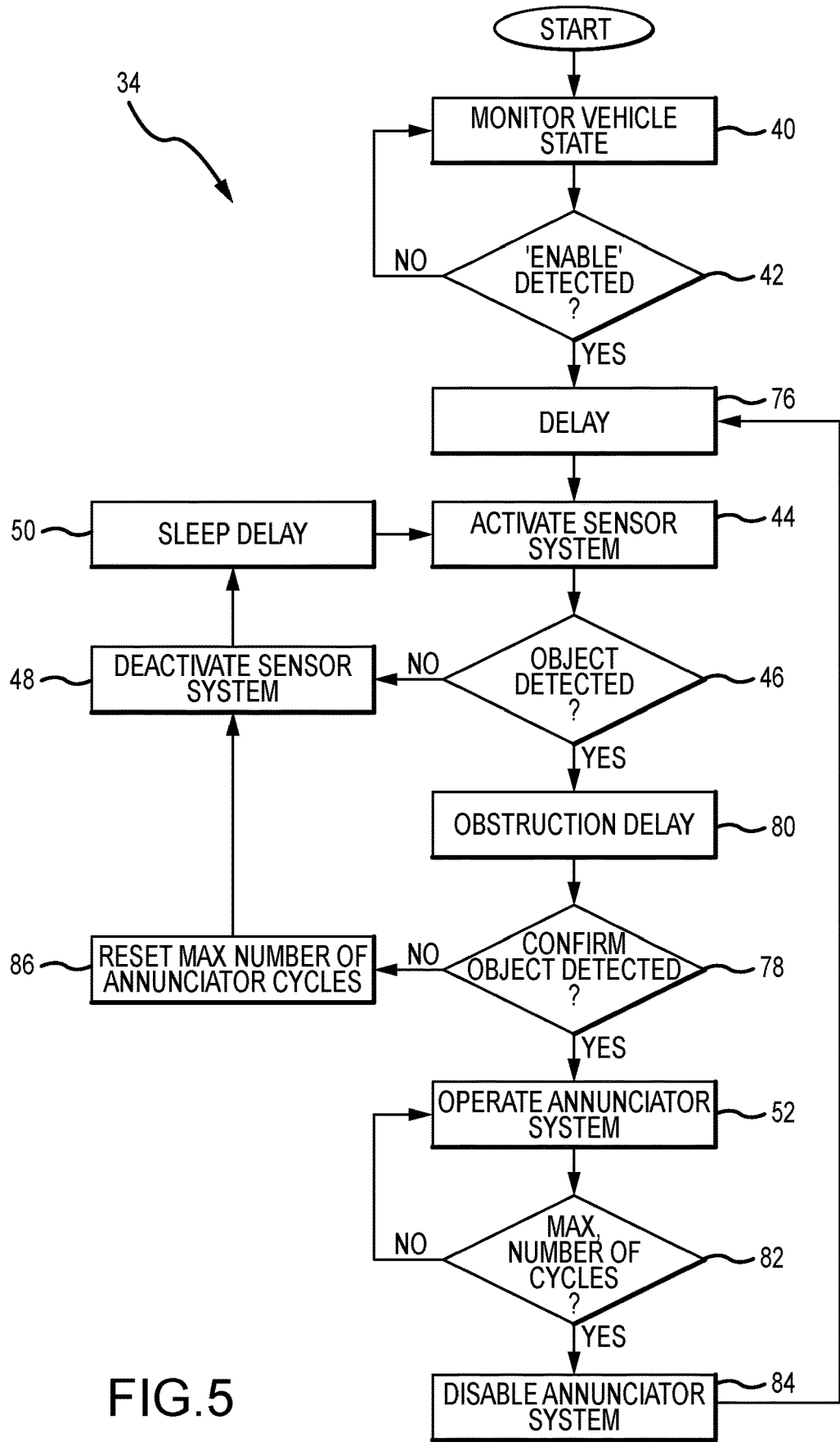
FIG. 5 is a flow chart of one embodiment of a method of determining when an object is located within the defined sensing region.

Proximity alert system 10 may be programmed or configured to implement a method 34 illustrated in FIG. 5 to provide an indication that an object 36, such as another vehicle, is located within a defined sensing region 38 adjacent the vehicle 12. See also FIGS. 2 and 3. A first step 40 of method 34 may involve determining a state of the vehicle 12 and whether that determined state is suitable or appropriate for operation of the proximity alert system 10. By way of example, in one embodiment, a suitable vehicle state is when the vehicle is at least stationary, preferably with the transmission selector (not shown) of vehicle 12 in the 'park' position and the and the ignition turned off. This vehicle state may be referred to herein in the alternative as a "Stationary State." In the particular embodiments shown and described herein, the control system 18 determines the state of the vehicle 12 from the vehicle data network system 32.

Once the control system 18 determines that the vehicle 12 is in the appropriate state, it may then determine, at step 42, whether the user has enabled the proximity alert system 10. In one embodiment, this determination may be made by monitoring the enable switch 24. If the user has enabled the proximity alert system 10, e.g., by activating the enable switch 24, control system 18 may then activate the sensor system 20 at step 44. The control system 18 then determines, at step 46, whether the sensor system 20 has detected the presence of the object 36 within the defined sensing region 38. If no such object 36 is detected, the control system 18 may then deactivate the sensor system 20, at step 48, in order to conserve vehicle battery power. After a sleep delay 50, the control system 18 may then reactivate the sensor system 20, e.g., by repeating step 44, which will again scan the defined sensing region 38 for the presence of one or more objects 36.

If an object 36 is detected within the defined sensing region 38, the control system 18 may then operate, at step 52, the annunciator system 22. Annunciator system 22 provides an indication that the object 36 has been detected within the defined sensing region 38. Such an indication may comprise a visual indication, an aural indication, or some combination of the two, to alert the operator or person associated with the detected object 36 that it is too close to the vehicle 12 and should be relocated.

A significant advantage of the systems and methods of the present invention is that they may be used to provide an indication to others that they have positioned an object or vehicle too close to the deployable ramp system of a wheelchair accessible vehicle. Such a person or operator may then remove or reposition the vehicle or object 36 as necessary so as not to impede access to the wheelchair accessible vehicle 12.

Having briefly described the systems and methods of the present invention, as well as some of their more significant features and advantages, various embodiments and alternative configurations of the systems and methods will now be described in detail. However, before proceeding with the description, it should be noted that while the systems and methods are described herein as they could be used in conjunction with a minivan type of wheelchair or mobility assist vehicle having a side-deploying ramp system, the present invention is not limited to use with such vehicle or with such side-deploying ramp systems. Persons having ordinary skill in the art will readily recognize that the systems and methods of the present invention could be used in conjunction with other types of vehicles having other types of ramp systems. Therefore, the present invention should not be regarded as limited to the particular vehicle, types and ramp systems shown and described herein.

Figure 4:
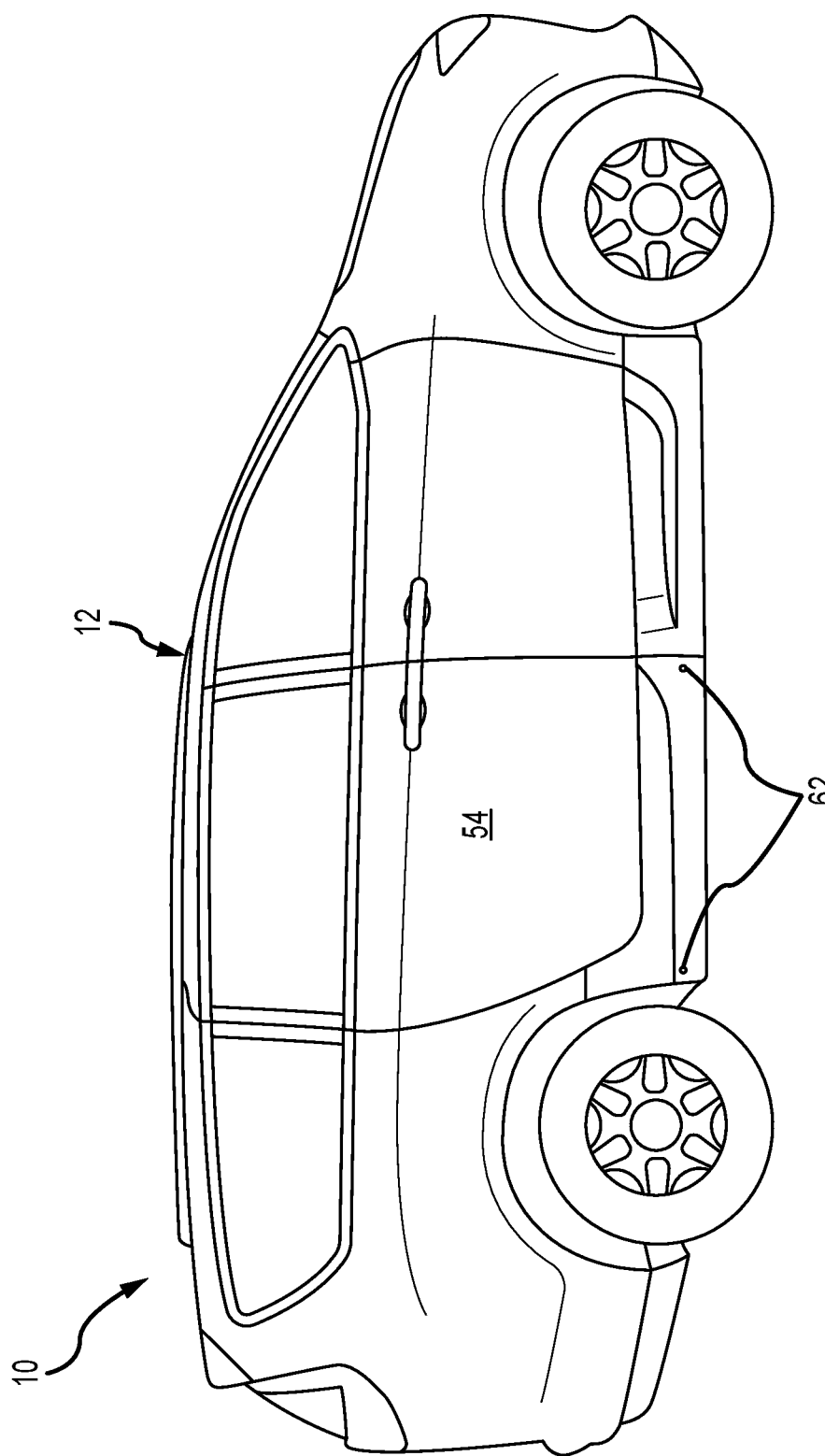
FIG. 4 is a side view of the vehicle illustrated in FIGS. 2 and 3 showing the locations of the sensors on the sliding side door.

Referring back now primarily to FIG. 1 and with occasional reference to FIGS. 2-4, one embodiment of the proximity alert system 10 is shown and described herein as it could be used in conjunction with a wheelchair accessible vehicle 12 having a ramp system 14 for deploying a ramp 16 to allow persons in wheelchairs or other mobility assist systems to easily enter and exit the vehicle 12. The ramp system 14 may be a power- or manually-deployable ramp system. In the particular embodiment shown and described herein, the vehicle 12 comprises a minivan having at least one sliding passenger door 54. The ramp 16 is deployed from the side of the vehicle 12, e.g., adjacent a sliding passenger door 54.

When the vehicle 12 is parked, the ramp system 14 defines a ramp access or sensing region 38 (FIG. 2) adjacent vehicle 12. The ramp access or sensing region 38 must be kept clear of objects 36, such as other vehicles, in order to allow the ramp 16 to be deployed and a person in a wheelchair or other mobility assist system to maneuver into position and ascend the ramp 16. See also FIG. 3. The overall extent, e.g., width 56 and depth 58, of ramp access or sensing region 38 will vary to some degree based on the particular vehicle 12 and ramp system 14 involved. Therefore, the present invention should not be regarded as limited to a sensing region 38 having any particular width 56 and depth 58. However, by way of example, in one embodiment, the width 56 of defined sensing region 38 may be approximately co-extensive with the length of the vehicle 12, or at least the width of the rear door (not shown) if the vehicle 12 has a rear-deploying ramp. The depth 58 of sensing region 38 may be about 2.7 m (about 9 ft.). In one embodiment, the depth 58 of the sensing region 38 may be selected to be any of a wide range of depths by simply providing the appropriate programming instructions to control system 18.

As briefly mentioned earlier, the proximity alert system 10 may comprise a control system 18, a sensor system 20, and an annunciator system 22. The sensor system 20 and annunciator system 22 are operatively connected to control system 18. Control system 18 may be configured or programmed to control the functions and operations of the sensor and annunciator systems 20 and 22. In one embodiment, the control system 18 may comprise a general purpose programmable microprocessor or microcontroller that is programmed or configured to control and/or interface with the various devices and systems in accordance with the teachings provided herein. By way of example, in one embodiment, control system 18 may comprise microprocessor product number PIC18F25K80-1/SS, available from Microchip Technology, Inc. of Chandler, Ariz. (US). Alternatively, other types of microprocessor systems that are now known in the art or that may be developed in the future could be used as well. However, because microprocessors of the type suitable for use as control system 18 are well-known in the art and are readily commercially available, the particular microprocessor that may be used as control system 18 will not be described in further detail herein.

If desired, the control system 18 may be provided with an in-circuit debugging or "ICD" connector 60. ICD connector 60 will allow a suitable in-circuit debugging system (not shown) to be connected to the control system 18 for programming and/or diagnostic purposes. Again, because such in-circuit debugging systems are well-known in the art and could be easily provided by persons having ordinary skill in the art, the particular type of in-circuit debugging systems and connector 60 that may be utilized in one embodiment will not be described in further detail.

The sensor system 20 is operatively connected to the control system 18 and may comprise one or more components and devices suitable for sensing or detecting objects 36 located within the sensing region 38 adjacent vehicle 12. In the particular embodiment shown and described herein, sensor system 20 may comprise a pair of sensors 62 suitable for sensing or detecting the presence of objects within a sensing area 64 associated with each particular sensor 62. Thus, sensors 62 should be positioned with respect to the vehicle 12 so that the sensing areas 64 associated with the sensors 62 are substantially co-extensive with the sensing region 38. See also FIG. 2. In an embodiment having two sensors 62, the sensors 62 may be mounted in spaced-apart relation on respective fore- and aft-portions of sliding passenger door 54, as best seen in FIG. 4. Alternatively, other arrangements are possible, as would be understood by persons having ordinary skill in the art after having become familiar with the teachings provided herein.

Sensors 62 may comprise any of a wide range of sensors, such as ultrasonic or radar sensors, now known in the art or that may be developed in the future that are or would be suitable for detecting objects located in the defined sensing region 38. Consequently, the present invention should not be regarded as limited to any particular type of sensors 62. However, by way of example, in one embodiment, each sensor 62 may comprise an ultrasonic mono-static transducer model no. MA58MF14-7N available from Murata Manufacturing Co., Ltd. of Smyrna, Ga. (US). Again, in one embodiment the sensors 62 may be mounted in spaced-apart relation to the sliding passenger door 54 of the vehicle 16 so that the sensing regions 64 will be substantially co-extensive with the ramp access region 38.

Depending on the particular type of sensors 62 that are to be used, each sensor 62 may be connected to a driver or signal processor 66 via a corresponding drive transformer 68. Driver or signal processor 66 may comprise any of a wide range of driver or signal processing circuits suitable for the particular type of sensor 62. In an embodiment utilizing the ultrasonic mono-static transducers specified herein, the driver or signal processor 66 may comprise an ultrasonic signal processor, model no. PGA460-Q1 available from Texas Instruments, Inc. of Dallas, Tex. (US). Alternatively, other devices could be used, as would become apparent to persons having ordinary skill in the art after having become familiar with the teachings provided herein. Drive transformer(s) 68 may comprise transformers suitable for use with the particular type of signal processor(s) 66 and sensor(s) 62 to be used, again as would become readily apparent to persons having ordinary skill in the art.

In the particular embodiment shown and described herein, each sensor 62 is capable of detecting the presence of objects within a wide range of spacings or distances from each respective sensor 62. Accordingly, control system 18 and/or sensor system 20 may be configured or programmed to ignore objects that may be detected closer than or beyond defined minimum and maximum distances from each sensor 62. By way of example, in one embodiment, the control system 18 is configured or programmed to ignore objects that are closer than about 0.5 m (about 1.6 ft.) or farther than about 2.7 m (about 9 ft.) from each sensor 62. The maximum sensing range of each sensor 62 is therefore coextensive with the depth 58 of defined sensing region 38. See FIG. 2. Alternatively, other distances could be used.

Annunciator system 24 may comprise an audio processor 70 and a speaker 72. Audio processor 70 is operatively connected to control system 18 and is operated thereby to provide an indication when an object or objects 36 have been detected within the ramp access or sensing region 38. In one embodiment, audio processor 70 is connected to the speaker 72 to provide an aural indication or warning to operators or persons associated with the detected object 36. By way of example, such an aural indication could comprise a pre-recorded voice command message that states:

"Attention. Please move your vehicle or the object. It is illegally parked in the stripes and prevents wheelchair access to this vehicle."

In other embodiments, the proximity warning could also include a visual indication, such as a flashing light or sign-board type message to the same effect. Of course, still other embodiments may provide some combination of visual and aural indications.

Audio processor 70 may comprise any of a wide range of systems and devices now known in the art or that may be developed in the future that are or would be suitable for providing the desired indication. Consequently, the present invention should not be regarded as limited to any particular type of system or device. However, by way of example, in one embodiment, the audio processor could comprise a voice/audio processor model no. IST2360 available from NuvoTon Technology Corporation, America of San Jose, Calif. (US). A programmer connector 74 may be connected to audio processor 70 to allow the desired message or messages to be downloaded to audio processor 70. Speaker 72 could comprise any of a wide range of speakers that are readily commercially available that would be suitable for the particular installation. Speaker 72 may be mounted to any convenient location on vehicle 12 so that the indication provided thereby will be discernable to persons outside the vehicle 12.

Proximity alert system 10 may also comprise an enable switch 24 and a status indicator 26. Enable switch 24 allows a user to enable and disable the proximity alert system 10. For example, a user need not enable the proximity alert system 10 in instances where the vehicle 12 is parked in the user's garage or in other situations where it is unlikely that a third party will park a vehicle too close to the wheelchair accessible vehicle 12. However, in instances where the user parks the vehicle 12 in a parking lot, the user may well want to enable the proximity alert system 10 to alert others if they position vehicles or objects 36 too close to the mobility assist vehicle 12. The enable switch 24 may be mounted at any convenient location on vehicle 12, such as on the dashboard or on the "B" pillar (not shown) located adjacent the sliding door 58. Alternatively, the enable switch could be provided on a key fob or other remote control device that can be conveniently carried by the user.

The status indicator 26 may provide an indication of the status (e.g., enabled or disabled) of the proximity alert system 10. Status indicator 26 may provide a visual status indication, an aural status indication, or some combination of the two. In one embodiment, the status indicator 26 may comprise one or more lamps or light emitting diodes (LEDs) to indicate the state of the proximity alert system 10. For example, the status indicator 26 may illuminate with a green color when the proximity alert system 10 is in the enabled state and a red color when the proximity alert system 10 is in the disabled state. The status indicator 26 may be integrated with enable switch 24 or may be provided at a separate location. If the status indicator 26 is to provide an aural status indication, then the function of the status indicator 26 could be provided by control system 18, which may command the speaker 72 to provide a short chirp or tone to indicate the system status.

As briefly mentioned above, the proximity alert system 10 may also comprise additional devices and systems that may be required or desirable for the particular installation and vehicle 12. For example, in most embodiments, the proximity alert system 10 may also comprise a vehicle interface system 28 to allow the control system 18 to interface with the vehicle data network 32 operatively associated with the vehicle 12. In many embodiments, the vehicle data network will comprise a Controller Area Network or CAN, in which case vehicle interface system 28 may comprise a CAN interface system. If the vehicle 12 uses a CAN system, the vehicle interface system 28 may comprise a CAN transceiver model no. MCP2561-E/SN available from Microchip Technology, Inc.

Vehicle interface system 28 allows the control system 18 to readily ascertain the state of the vehicle 12, thus determine whether to act on an enable command produced by enable switch 24. In one embodiment, control system 18 will act on a received enable command only when the vehicle 12 is determined to be in a Stationary State. In one embodiment, control system 18 determines the vehicle 12 to be in the Stationary State when the control system 18 determines from the vehicle data network 32 that the transmission selector is in the 'park' position and the vehicle ignition is in the 'off' position. Alternatively, other vehicle states can be defined that will allow the control system 18 to act on a received enable command.

Proximity alert system 10 may also be provided with a power system 30 for providing the various components and devices of proximity alert system 10 with electrical power. In one embodiment, power system 30 may derive its power from the vehicle electrical system 31, although other arrangements are possible. In any event, because such power systems 30 are well-known in the art and could be readily provided by persons having ordinary skill in the art after having become familiar with the teachings provided herein, the particular power system 30 that may be utilized in various embodiments of the invention will not be described in further detail.

As mentioned, control system 18 may be configured or programmed to operate in accordance with methods described herein. The methods may be embodied in various software packages or modules provided on non-transitory computer-readable storage media or firmware that may be accessed by control system 18. The non-transitory computer-readable storage media or firmware are provided with computer-executable instructions thereon that, when performed by control system 18, cause the control system 18 to process information and data and control or operate the various systems in accordance with the various methods described herein.

With reference now primarily to FIG. 5, proximity alert system 10 may be programmed or configured to implement method 34 to provide an indication that an object or objects 36, such as a vehicle (FIG. 3), has been detected within the defined sensing region 38. A first step 40 of method 34 may involve monitoring a state of the vehicle 12. In the various embodiments shown and described herein, the proximity alert system 10 may be activated or enabled when the vehicle 12 is in the defined Stationary State. In one embodiment, the Stationary State is defined as that state when the vehicle is parked with the engine off. The control system 18 may determine the state of the vehicle 12 from the vehicle data network 32, e.g., by confirming that the vehicle transmission selector is in the 'park' position and the vehicle ignition system is turned off.

Once the control system 18 determines that the vehicle 12 is in the Stationary State, or some other defined state appropriate for the operation of the proximity alert system 10, the control system 18 then determines, at step 42, whether the user has enabled the proximity alert system 10. In one embodiment, this determination is made by monitoring the enable switch 24. If the user has enabled the proximity alert system 10 and the vehicle 12 is in the Stationary State, control system 18 may then activate the sensor system 20 at step 44. If a status indicator 26 is provided, the control system 18 may also operate the status indicator 26 to provide the appropriate indication, e.g., a green light indicating that the proximity alert system 10 has been enabled. Of course, if the user has not yet enabled the system 10, then the control system 18 would operate the status indicator 26 to provide the appropriate indication, e.g., a red light. In embodiments wherein the status indicator 26 is to provide an aural status indication, either alone or in addition to a visual indication, control system 18 may operate speaker 72 to provide a short chirp or tone to indicate that the proximity alert system 10 has been enabled.

In most embodiments it will be generally preferred, but not required, to delay 76 the activation 44 of sensor system 20 for some period of time after the system 10 is enabled. The delay 76 allows the vehicle operator or user (not shown) sufficient time to move out of the defined sensing region 38. Delay 76 thereby reduces or eliminates the possibility of producing an indication or alarm due to the presence of the vehicle operator or user within the defined sensing region 38. In some embodiments, the extent of the delay 76 may be programmable by the user, by a service technician, or both.

During step 44, the sensor system 20 operates the various sensors 62 to determine whether an object 36 is present in the defined sensing region 38. In some embodiments, the sensors 62 may be operated sequentially, with the sensor 62 located on the forward portion of the sliding door 54 being operated first, followed by sensor 62 located on the rear portion of sliding door 54. See FIG. 4. If neither sensor detects the presence of an object within its respective sensing area 62, then control system 18 concludes, at step 46, that no object 36 is present within the defined sensing region 38. Control system 18 may then deactivate the sensor system 20. In most embodiments, it will be desired, but not required, to include a sleep delay step 50 before reactivating (e.g., at step 44) the sensor system 20 to scan for objects 36 within the defined sensing region 38. The sleep delay step 50 will help to conserve vehicle battery power. The duration of the sleep delay 50 may be programmable by a service technician. Example durations of the sleep delay 50 may range from about 2 seconds to about 15 seconds, although other durations, shorter or longer, may be used.

If the control system 18 concludes at step 46 that an object 36 is present within the defined sensing region 38, e.g., if one or both of the sensors 62 detected an object withing its respective sensing area 64, then control system 18 may proceed to step 52 and operate the annunciator system 22. Optionally, before proceeding to step 52, control system 18 may first confirm, at step 78, that an object 36 was indeed detected within the defined sensing region 38. Confirmation step 78 may involve repeating step 44 in which the sensor system 20 activates the sensors 62 to scan for objects 36. If desired, an obstruction delay period 80 may be allowed to elapse before confirmation step 78. Obstruction delay period 80 will tend to reduce the occurrences of 'false positives' by allowing a short time period to elapse before re-scanning the defined sensing region 38. The duration of the obstruction delay period 80 may be programmable by a service technician. Example durations of the obstruction delay 80 may range from about 1 second to about 3 seconds, although other durations may be used.

After the control system 18 determines that an object 36 is present within the defined sensing region 38 (e.g., after either step 46 and, if desired, optional confirmation step 78), control system 18 may operate, at step 52, the annunciator system 22. As mentioned, annunciator system 22 provides an indication that the object 36 has been detected within the defined sensing region 38. As described above, such an indication may comprise a visual indication, an aural indication, or some combination of the two, to alert the operator or person associated with the detected object 36 that it is too close to the vehicle 12 and should be relocated.

In the particular embodiments shown and described herein, control system 18 is programmed to operate the annunciator system 22 for a limited number of times to avoid the occurrence of non-stop alarms, e.g., where the object 36 remains in the defined sensing region 38. The number of times the annunciator system 22 will provide the indications may be programmable by a service technician. By way of example, in one embodiment, the number of indications may be programmed to be three (3). Of course, a greater or fewer number of indications or cycles may be programmed.

If the object 36 is still present within the defined sensing region 38 after the maximum number of annunciator indications (e.g., 3 cycles), as determined during step 82, control system 18 may disable, at step 84, the annunciator system 22. The control system 18 may then return to step 44 to activate the sensor system 20 to continue to scan the defined sensing region 38 for the presence of objects 36. If subsequent scanning reveals that the object 36 is no longer present in the defined sensing region 38, then control system 18 may reset to zero at step 86 the maximum number of annunciator cycles. Resetting step 86 allows the annunciator system 22 to be operated again if another object 36 is detected within the sensing region 36.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A proximity alert system for a vehicle, comprising:
   a control system;
   a sensor system operatively associated with said control system, said sensor system operable to detect a presence of an object within a ramp access region exterior to the vehicle, the ramp access region being defined by a deployable ramp operatively associated with the vehicle; and
   an annunciator system operatively associated with said control system, said annunciator system being operable to provide an indication that the object has been detected within the defined ramp access region, said control system actuating said sensor system when the vehicle is stationary, said control system operating said annunciator system when said sensor system detects the presence of the object within the defined ramp access region.

2. The proximity alert system of claim 1, further comprising an enable switch operatively associated with said control system, said enable switch being operable by a user to place said proximity alert system in either of an enabled state or a disabled state.

3. The proximity alert system of claim 2, further comprising a system status indicator operatively associated with said control system, said system status indicator being operable to provide a status indication of whether said proximity alert system is in the enabled state or the disabled state.

4. The proximity alert system of claim 3, wherein the status indication comprises one, or more status indications consisting of an aural status indication and a visual status indication.

5. The proximity alert system of claim 1, further comprising a vehicle interface system operatively associated with said control system, said vehicle interface system being operable to allow said control system to communicate with a vehicle data network operatively associated with the vehicle.

6. The proximity alert system of claim 5, wherein the vehicle data network comprises a CAN network and wherein said vehicle interface system comprises a CAN interface system.

7. The proximity alert system of claim 1, wherein the indication comprises one or more indications consisting of an aural indication and a visual indication.

8. The proximity alert system of claim 1, wherein said annunciator system comprises a speaker.

9. The proximity alert system of claim 8, wherein said annunciator system further comprises an audio processor system operatively connected to said speaker, said audio processor system being operable to cause said speaker to issue an aural indication when said sensor system detects the presence of the object within the defined ramp access region.

10. The proximity alert system of claim 1, wherein said sensor system comprises an ultrasonic sensor.

11. A mobility assist vehicle, comprising:
   a ramp operatively associated with said vehicle, said ramp being moveable between a deployed position and a stowed position, the ramp defining a ramp access region exterior to the vehicle when the vehicle is stationary;
   a proximity alert system operatively associated with said mobility assist vehicle, said proximity alert system comprising:
      a control system;
      a sensor system operatively associated with said control system, said sensor system operable to detect a presence of an object within the defined ramp access region; and
      an annunciator system operatively associated with said control system, said annunciator system being operable to provide an indication that the object has been detected within the defined ramp access region, said control system actuating said sensor system when the vehicle is stationary, said control system operating said annunciator system when said sensor system detects the presence of the object within the ramp access region.

12. The mobility assist vehicle of claim 11, further comprising a side door operatively associated with said vehicle, said ramp being mounted adjacent said side door so that said ramp extends through an opening defined by said vehicle when said side door is in an opened position and when said ramp is in the deployed position, said sensor system comprising a first sensor mounted to said side door.

13. The mobility assist vehicle of claim 12, wherein said sensor system further comprises a second sensor mounted to said side door in spaced-apart relation to said first sensor.

14. A method of detecting a presence of an object adjacent a vehicle, comprising:
  detecting an 'enable' command issued by a user;
  activating a sensor system in response to the sensed enable command;
  determining whether the sensor system has detected the presence of the object within a ramp access region exterior to the vehicle, the ramp access region being defined by a deployable ramp operatively associated with the vehicle; and
  operating an annunciator system when the sensor system has detected the presence of the object within the defined ramp access region, the annunciator system providing an indication that an object is present within the defined ramp access region.

15. The method of claim 14, further comprising deactivating the sensor system when the sensor system has not detected the presence of the object within the defined ramp access region.

16. The method of claim 15, further comprising repeating said activating, said determining, and said deactivating steps.

17. The method of claim 16, further comprising allowing a first sleep time to elapse between said deactivating step and said activating step when the sensor system has not detected the presence of the object within the defined ramp access region.

18. The method of claim 16, further comprising allowing a second sleep time to elapse after said determining step when the sensor system has detected the presence of the object within the defined ramp access region.

19. The method of claim 14, further comprising confirming that the sensor system has detected the presence of the object within the defined ramp access region before performing said operating step.

20. The method of claim 19, wherein said confirming step comprises performing said activating and said determining steps.

21. The method of claim 14, further comprising repeating said operating step for a predetermined number of times so long as the sensor system detects the presence of the object within the defined ramp access region.

22. The method of claim 21, further comprising resetting the predetermined number of times when the sensor system no longer detects the presence of the object in the defined ramp access region so that said operating step can performed again if the sensor system detects the presence of a second object within the defined ramp access region.

23. The method of claim 14, further comprising monitoring a vehicle state to determine when the vehicle is in a Stationary State and wherein said activating step is performed only when the monitored vehicle state is the Stationary State.

24. The method of claim 23, further comprising determining that the vehicle is in the Stationary State when a transmission selector of the vehicle is in a 'park' position.

25. The method of claim 14, further comprising allowing an enable-delay time to elapse between said detecting step and said activating step.

26. A non-transitory computer-readable storage medium having computer-executable instructions embodied thereon that, when executed by at least one computer processor, cause the processor to:
  detect an 'enable' command issued by a user;
  activate a sensor system operatively associated with a vehicle in response to the sensed enable command when the vehicle is stationary;
  determine whether the sensor system has detected the presence of an object within a ramp access region exterior to the stationary vehicle, the ramp access region being defined by a deployable ramp operatively associated with the vehicle; and
  operate an annunciator system when the sensor system has detected the presence of the object within the defined ramp access region, the annunciator system providing an indication that an object is present within the defined ramp access region.

* * * * *

UNITED STATES PATENT AND TRADEMARK OFFICE
CERTIFICATE OF CORRECTION

PATENT NO. : 10,850,665 B1
APPLICATION NO. : 16/898698
DATED : December 1, 2020
INVENTOR(S) : Mark Charles Miller, Jeffrey Powell Butler and Kelly Eugene Stephenson Page 1 of 1

It is certified that error appears in the above-identified patent and that said Letters Patent is hereby corrected as shown below:

In the Claims

Column 10, Claim 4 Line 25, "comprises one, or more" should be -- comprises one or more --

Column 12, Claim 22 Line 15, "operating step can performed" should be -- operating step can be performed --

Signed and Sealed this
First Day of March, 2022

Drew Hirshfeld
*Performing the Functions and Duties of the
Under Secretary of Commerce for Intellectual Property and
Director of the United States Patent and Trademark Office*